United States Patent
Cremeans et al.

(10) Patent No.: US 6,630,429 B1
(45) Date of Patent: Oct. 7, 2003

(54) LOST CIRCULATION MATERIAL AND METHOD OF USE

(76) Inventors: Keet Stene Cremeans, P.O. Box 2167, Stateline, NV (US) 89449; Jim G. Cremeans, P.O. Box 2167, Stateline, NV (US) 89449

( * ) Notice: Subject to any disclaimer, the term of this patent is extended or adjusted under 35 U.S.C. 154(b) by 97 days.

(21) Appl. No.: 09/752,499

(22) Filed: Dec. 28, 2000

Related U.S. Application Data
(60) Provisional application No. 60/173,616, filed on Dec. 29, 1999.

(51) Int. Cl.[7] .................................................. C09K 7/02
(52) U.S. Cl. .......................... 507/104; 507/204; 175/72
(58) Field of Search ................................ 507/104, 204; 175/72

(56) References Cited

U.S. PATENT DOCUMENTS

| | | | |
|---|---|---|---|
| 3,818,998 A | 6/1974 | Hessert | 175/72 |
| 3,953,336 A | 4/1976 | Daigle | 252/8.5 A |
| 4,014,394 A | 3/1977 | Bailey | 175/72 |
| 4,043,921 A | 8/1977 | Hessert et al. | 252/8.5 C |
| 4,183,406 A | 1/1980 | Lundberg et al. | 166/294 |
| 4,217,965 A | 8/1980 | Cremeans | 175/72 |
| 4,428,844 A * | 1/1984 | Wagener | 507/104 |
| 4,474,665 A | 10/1984 | Green | 252/8.5 LC |
| 4,498,995 A | 2/1985 | Gockel | 252/8.5 LC |
| RE32,114 E | 4/1986 | Argabright et al. | 166/252 |
| 4,629,575 A | 12/1986 | Weibel | 252/8.551 |
| 4,643,255 A | 2/1987 | Sandiford et al. | 166/295 |
| 4,664,816 A | 5/1987 | Walker | 252/8.512 |
| 4,706,754 A | 11/1987 | Smith | 166/295 |
| 4,836,940 A | 6/1989 | Alexander | 252/8.512 |
| 5,071,575 A | 12/1991 | House et al. | 507/104 |
| 5,076,944 A | 12/1991 | Cowan et al. | 507/104 |
| 5,087,611 A | 2/1992 | Forrest | 507/104 |
| 5,118,664 A | 6/1992 | Burts | 507/104 |
| 5,147,852 A * | 9/1992 | Cowan et al. | 507/104 |
| 5,222,558 A | 6/1993 | Montgomery et al. | 166/278 |
| 5,333,689 A | 8/1994 | Jones et al. | 166/278 |
| 5,377,760 A | 1/1995 | Merrill | 166/295 |
| 5,667,024 A | 9/1997 | Wittliff | 175/72 |
| 6,105,674 A | 8/2000 | Liao et al. | 166/292 |
| 2002/0040812 A1 * | 4/2002 | Heying | 507/104 |
| 2002/0128158 A1 * | 9/2002 | Green | 507/104 |
| 2002/0147113 A1 * | 10/2002 | Green | 507/104 |

OTHER PUBLICATIONS

Glen E. Loeppke et al, "Design and Evaluation of Lost–circulatin Materials for Severe Environments", Mar. 1990 *JPT*, pp. 328–337.

Loeppke, et al. "Design and Evaluation of Lost–Circulation Materials for Severe Environments", Copyright 1990 Society of Petroleum Engineers, Mar. 1990. JPT, pp. 328–337.

* cited by examiner

*Primary Examiner*—Philip Tucker

(57) ABSTRACT

An environmentally safe lost circulation material and method of use which provides effective drill bit lubrication over a wide temperature range and allows drilling in a variety of porous or fractured subterranean structures. The lost circulation material comprises generally pelletized cottonseed hulls together with between approximately 0.001% and 0.01% by weight of preservative. In another preferred embodiment of the invention, the lost circulation material comprises of between approximately 98% and 99.5% by weight of pelletized cottonseed hulls, between approximately 0.5% and 2.0% by weight of corn starch, between approximately 0.001% and 0.01% by weight of surfactant, and between approximately 0.001% and 0.01% by weight of preservative. In another preferred embodiment, the lost circulation material comprises between approximately 50% and 80% by weight of pelletized cottonseed hulls, between approximately 10% and 40% by weight of pelletized wood, between approximately 0.001% and 20% by weight of water-swellable cross-linked polymer, between approximately 0.5% and 2.0% by weight corn starch or other vegetable starch, between approximately 0.001% and 0.01% by weight of surfactant, and between approximately 0.001% and 0.01% by weight of preservative.

7 Claims, No Drawings

LOST CIRCULATION MATERIAL AND METHOD OF USE

This application is entitled to the benefit of U.S. Provisional Patent Application Ser. No. 60/173,616, filed on Dec. 29, 1999.

BACKGROUND OF THE INVENTION

1. Field of the Invention

This invention pertains generally to lost circulation materials and methods, and more particularly to a highly effective, environmentally safe loss circulation material and method use. The invention can be effectively employed in oil, gas, water, geothermal, offshore, and like drilling and excavation applications.

2. Description of the Background Art

During the drilling of wells for oil, gas and other materials, a drilling fluid is generally circulated through the well bore to the drill bit. The drilling fluid lubricates and cools the drill bit and removes cuttings from the drill bit. A common problem during drilling is lost circulation of the drilling fluid, which occurs when the drill bit encounters highly permeable or fractured subterranean formations during drilling. The drilling fluid can drain into the porous formations and thus be lost from circulation around the drill bit. The loss of drilling fluid in this manner can result in loss of the drilling structure, unwanted cavity formation, damage to the drill bit and interruption of the drilling operation.

In order to avoid such lost circulation problems, a variety of lost circulation miaterials or LCMs have been developed for addition to the drilling fluid. These materials form gels, slurries, colloidal dispersions when added to the drilling fluid, otherwise render the drilling fluid less susceptible to loss from circulation in porous or fractured strata. Typically, the drilling fluid is circulated from the drill bit back to the top of the well, via annulus return, where a "mud pit" is used to add the lost circulation material to the drilling fluid. The lost circulation material is agitated in the mud pit until a gel or slurry forms, after which it is pumped back down the hole for circulation through the drill bit. The lost circulation material and drilling fluid will typically have to withstand elevated temperatures associated with the drill bit. The ideal lost circulation material should also be able to bridge and cross-link across pores or fractures of varying sizes which are encountered during drilling, in order to prevent fluid loss. To achieve these ends, numerous types of natural and man-made fibers, gels, surfactants, clays, and mixtures thereof have been developed for use as lost circulation materials.

Previously used lost circulation materials have generally proved deficient in one or more respects. For example, lost circulation materials which are mixed directly in the mud pit often result in rapid increases in viscosity of the drilling fluid, and are difficult to pump or circulate back to the drill bit. Lost circulation materials based on natural and man-made fibers tend to be bulky and are inconvenient to store and transport. Many natural materials additionally are subject to decay, mildew and insect depredation during storage. Further, many lost circulation materials include one or more materials which may present an environmental problem which remains at the drill site after drilling and pumping operations are terminated. Various attempts have been made at mixing natural and man-made fiber materials with clays such as bentonite. However, lost circulation materials based on clays and cement often result in unwanted, irreversible clogging of the production zone of a well.

There is accordingly a need for a lost circulation material and method of use which is heat resistant, which provides effective bridging, which does not need to be mixed directly in the mud pit, which is compact and easy to transport and store, which avoids clogging of well production zones, and which uses environmentally safe materials. The present invention satisfies these needs, as well as others, and generally overcomes the deficiencies found in the prior art.

SUMMARY OF THE INVENTION

The invention is an environmentally safe lost circulation material and method of use which provides effective drill bit lubrication, over a wide temperature range, for drilling in a variety of porous or fractured subterranean structures In its most general terms, the invention is a lost circulation material comprising pelletized natural fiber material, preferably together with between approximately 0.001% and approximately 0.01% by weight of preservative. The preferred pelletized natural fiber material is pelletized cotton seed hulls, but may alternatively or additionally comprise pelletized nut shells, bean hulls, hemp, jute, or any other vegetable fiber or natural fiber.

In one preferred embodiment of the invention, the lost circulation material comprises of between approximately 98% and approximately 99.5% by weightof pelletized natural fiber, between approximately 0.5% and approximately 2.0% by weight of vegetable starch, and between approximately 0.001% and approximately 0.01% by weight of preservative.

In another preferred embodiment of the invention, the lost circulation material comprises of between approximately 98% and approximately 99.5% by weight of pelletized cottonseed hulls or other pelletized natural fiber material, between approximately 0.5% and approximately 2.0% by weight of corn starch or other vegetable starch, between approximately 0.001% and approximately 0.01% by weight of preservative, and between approximately 0.001% and approximately 0.01% by weight of surfactant.

In yet another preferred embodiment, the lost circulation material comprises of between approximately 50% and approximately 80% by weight of pelletized cottonseed hulls or other pelletized natural fiber material, between approximately 10% and approximately 40% by weight of pelletized wood, between approximately 0.001% and approximately 20% by weight of water-swellable cross-linked polymer, between approximately 0.5% and approximately 2.0% by weight corn starch or other vegetable starch, between approximately 0.001% and approximately 0.01% by weight of preservative, and between approximately 0.001% and approximately 0.01% by weight of surfactant.

The method of the invention comprises generally of providing a lost circulation material of the type described above in accordance with the invention, and adding said lost circulation material, in dry form, directly into the suction portion of the mud pit, without mixing with fluid in the mud pit. The lost circulation material is transported down to the "Kelly" in dry form, and mixes with fluid and undergoes swelling proximate to the bottom of the well to preserve the well structure.

An object of the invention is to provide a lost circulation material and method which utilizes only environmentally compatible materials.

Another object of the invention is to provide a lost circulation material and method which provides effective drill bit lubrication over a wide temperature range.

Another object of the invention is to provide a lost circulation material and-method which undergoes effective bridging and plugs pores and fractures of various sizes.

Another object of the invention is to provide a lost circulation material and method which does not need to be mixed directly in the mud pit.

Another object of the invention is to provide a lost circulation material and method which is compact form and is easy to transport and store.

Another object of the invention is to provide a lost circulation material and method which avoids clogging of well production zones.

Further objects and advantages of the invention will be brought out in the following portions of the specification, wherein the detailed description is for the purpose of fully disclosing the preferred embodiment of the invention without placing limitations thereon.

DETAILED DESCRIPTION OF THE PREFERRED EMBODIMENTS

Referring now to the following detailed description, it will be seen that the invention provides a new lost circulation material and method of use which provides effective bridging, which does not need to be mixed directly in the mud pit, which is compact and easy to transport and store, which avoids clogging of well production zones, and which uses environmentally safe materials. The invention is disclosed generally in terms of use with oil well drilling. It should be readily apparent to those skilled in the art, however, that the invention may be used in various types of drilling, mining, or other subterranean operations wherein materials are used to control fluid flow and/or plug bores or porous structures to prevent fluid loss, including water, geothermal, natural gas, coal, mineral, subterranean nuclear waste storage, and like operations. Other uses for the invention will suggest themselves upon review of this disclosure.

The invention utilizes pelletized cottonseed hulls which are prepared using a conventional quarter inch pellet mill. The preferred pelletized cottonseed hulls will preferably comprise, for example, between approximately 75% and 85% by weight of fiber, between approximately 5% and 10% by weight of crude protein, between approximately 0.005% and 0.01% by weight of crude fat, and between approximately 10% and 15% by weight of ash. Preferably, the cottonseed hulls are acid treated prior to pelletizing, to reduce the length of fibers in the cottonseed hulls. This type of pelletized cottonseed hull is commonly used as animal feed. Pelletized cotton seed hulls of this type were purchased from Farmers Warehouse Co., of Keyes, Calif., for use in the specific examples described below. The invention may alternatively utilized non-treated cotton seed hulls which have been pelletized. Without the acid treatment, however, the fiber in the cottonseed hulls is relatively long and can undergo unwanted "twining" or balling of around pumping equipment. As noted above, various other natural fiber materials in pelletized form may also be used with the invention in place of cottonseed hulls.

The vegetable starch used with the invention preferably comprises conventional corn starch or tapioca (manioc root) starch. Various other vegetable starches, in pure or native form, may also be used. The preservative used with the invention is preferably citric acid or an alkalai metal salt thereof. One presently preferred preservative commercially available preservative is AQUAPLUS, from Syndicate Sales, Inc. of Kokomo, Ind. The preferred surfactant is preferably a non-ionic polymeric surfactant such as polyethylene glycols (PEG), polysorbates, or mixtures th ereof, at varying levels of molecular weight. One presently preferred surfactant used with the invention is SOAX™ concentrated wetting agent, made by Oasis Grower Products of Kent, Ohio.

The corn starch, preservative and surfactant may be mixed with or added to the cottonseed hulls prior to pelletizing. In this regard, an aqueous solution or dispersion of the corn starch, preservative and surfactant is prepared. The solution or dispersion of corn starch, preservative and surfactant is sprayed onto cotton seed hulls and allowed to dry. The cottonseed hulls thus treated are then pelletized in a quarter inch pellet mill to provide pellets which contain cottonseed hulls together with the corn starch, preservative and surfactant in accordance with the invention. The corn starch and/or surfactant can be omitted from the aqueous solution for different embodiments of the invention.

The pelletized wood used with the invention preferably comprises compressed or pelletized alderwood sawdust prepared with a conventional quarter inch pellet mill. Pelletized firwood sawdust or other pelletized sawdust, of the type commonly used in heating stoves and furnaces, may be alternatively be used.

The water-swellable crosslinked polymer preferably comprises polyacrylamide with between approximately 30 ppm and 100 ppm by weight of cross-linking agent such as methylene diacrylamide. The water-swellable crosslinked polymer may additionally comprise, in part or in whole, polyacrylic acid, poly-N-hydroxyethyl acrylamide, polyhydroxyethyl acrylate, polyhydroxyethyl methacrylate, and copolymers and/or blends of the same. Suitable polymers for use with the invention are described in detail in U.S. Pat. No. 4,559,074, the disclosure of which is incorporated herein by reference. The CARBOPOL® polyacrylic acid based thickeners from BF Goodrich Inc. may also be used with the invention. The water-swellable crosslinked polymer is preferably utilized in dry, powdered form. One presently preferred water-swellable crosslinked polymer for use with the invention is Broadleaf P4® cross-linked polyacrylamide resin powder.

EXAMPLE 1

Thirty three pounds of pelletized cottonseed hull, seventeen pounds of pelletized sawdust, and one third (0.3) pounds of Broadleaf P4® cross-linked polyacrylamide resin powder were mixed together to provide a lost circulations material, which was stored as a dry mix at room temperature. The pelletized cottonseed hull may contain corn starch and preservative in the pellets as described above. The dry mix may be stored indefinitely as long as kept dry.

To the dry mix prepared as described above was added twelve and one half (12.5) gallons of water. The mix was briefly stirred, and allowed to sit for hirty minutes. The resulting mix swelled to approximately five time (5×) the riginal volume of the dry mix.

EXAMPLE 2

Eight oz. weight of pelletized cottonseed hull, 2.8 oz. weight of pelletized wood, and two oz. of Broadleaf P4® cross-linked polyacrylamide resin powder were mixed together and stored as a dry mix The dry mix was added to 12.8 oz weight of water, briefly stirred, and allowed to sit for thirty minutes. The resulting mix swelled to approximately one half gallon volume

EXAMPLE 3

The dry mix prepared in Example Ihas been used in down well applications by adding the dry mix directly to the suction pit of the mud pit of an oil well The fluid circulation time for the well was approximately 60 to 90 minutes. The resulting fluid provided good lubrication of the drill bit, with minimal fluid loss, due to bridging and cross-link formation of the lost circulation material.

Accordingly, it will be seen that this invention provides a lost circulation material and method of use which is heat resistant, which provides effective bridging, which does not need to be miked directly in the mud pit, which is compact and easy to transport and store, which avoids clogging of well production zones, and which uses environmentally safe materials. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A lost circulation material, comprising:
    (a) between approximately 50% and approximately 80% by weight of pelletized cottonseed hulls;
    (b) between approximately 0.5% and approximately 2.0% by weight vegetable starch; and
    (c) between approximately 0.001% and approximately 0.01% by weight of preservative.

2. The lost circulation material of claime 1, further comprising between approximately 10% and 40% by weight of pelletized wood.

3. The lost circulation material of claim 1, further comprising between approximately 0.001% and approximately 20% by weight of water-swellable cross-linked polymer.

4. The lost circulation material of claim 1, further comprising between approximately 0.001% and approximately 0.01% by weight of surfactant.

5. A lost circulation material comprising:
    pelletized natural fiber with from about 0.001% to about 0.01% by weight of preservative; and from about 0.5% to about 2% by weight of vegetable starch.

6. The lost circulation material of claim 5, wherein said vegetable starch comprises corn starch.

7. A lost circulation material comprising:
    pelletized natural fiber with from about 0.001% to about 0.01% by weight of preservative; and from about 0.001% to about 0.01% by weight of surfactant.

* * * * *